(12) United States Patent
Tsukano

(10) Patent No.: US 10,313,563 B2
(45) Date of Patent: Jun. 4, 2019

(54) ON-FOIL OBJECT COLOR ADJUSTMENT DEVICE, IMAGE FORMING APPARATUS AND NON-TRANSITORY RECORDING MEDIUM STORING A COMPUTER READABLE PROGRAM

(71) Applicant: Konica Minolta, Inc., Tokyo (JP)

(72) Inventor: Toshiki Tsukano, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/972,869

(22) Filed: May 7, 2018

(65) Prior Publication Data
US 2018/0367706 A1 Dec. 20, 2018

(30) Foreign Application Priority Data

Jun. 16, 2017 (JP) ................................. 2017-118884

(51) Int. Cl.
| | |
|---|---|
| *H04N 1/60* | (2006.01) |
| *G03G 15/16* | (2006.01) |
| *G03G 15/00* | (2006.01) |
| *G06K 15/02* | (2006.01) |

(52) U.S. Cl.
CPC ....... *H04N 1/6027* (2013.01); *G03G 15/1625* (2013.01); *G03G 15/6582* (2013.01); *G03G 15/6588* (2013.01); *G06K 15/18* (2013.01); *H04N 1/6097* (2013.01)

(58) Field of Classification Search
None
See application file for complete search history.

(56) References Cited

U.S. PATENT DOCUMENTS

| | | | | |
|---|---|---|---|---|
| 5,333,549 | A * | 8/1994 | Feldman | B41F 17/00 101/217 |
| 7,738,149 | B2 * | 6/2010 | Rich | H04N 1/603 358/1.15 |
| 8,830,526 | B2 * | 9/2014 | Koyatsu | G06K 15/18 358/1.1 |
| 9,658,556 | B2 * | 5/2017 | Kubo | B41J 2/2117 |
| 10,124,574 | B2 * | 11/2018 | Ono | B41F 19/062 |
| 2007/0263249 | A1 * | 11/2007 | Rich | H04N 1/54 358/1.15 |

(Continued)

FOREIGN PATENT DOCUMENTS

JP 2014-35419 A 2/2014

OTHER PUBLICATIONS

Extended European Search Report issued in corresponding European Application No. 18166998.7 dated Aug. 10, 2018 (11 pages).

*Primary Examiner* — Barbara D Reinier
(74) *Attorney, Agent, or Firm* — Osha Liang LLP

(57) ABSTRACT

An on-foil object color adjustment device includes a data receiver that obtains non-bonded area data relating to a non-bonded area; and a hardware processor that: calculates a ratio of a size of the non-bonded area to a size of the foil area based on the non-bonded area data obtained by the data receiver; calculates, based on the calculated ratio, a color of the non-bonded area, a color of the foil, and color data of an on-foil object, a first influence degree indicating an influence of the non-bonded area on a color of the on-foil object to be printed in the foil area after the foil-bonding; and adjusts the color data of the on-foil object based on the calculated first influence degree.

14 Claims, 12 Drawing Sheets

(56) References Cited

U.S. PATENT DOCUMENTS

| | | | | |
|---|---|---|---|---|
| 2008/0144141 A1* | 6/2008 | Tai | ......................... | H04N 1/603 |
| | | | | 358/518 |
| 2012/0320386 A1 | 12/2012 | Sone et al. | | |
| 2014/0043625 A1* | 2/2014 | Koyatsu | ................. | G06K 15/18 |
| | | | | 358/1.9 |
| 2016/0086060 A1* | 3/2016 | Kubo | ..................... | B41J 2/2117 |
| | | | | 399/38 |

\* cited by examiner

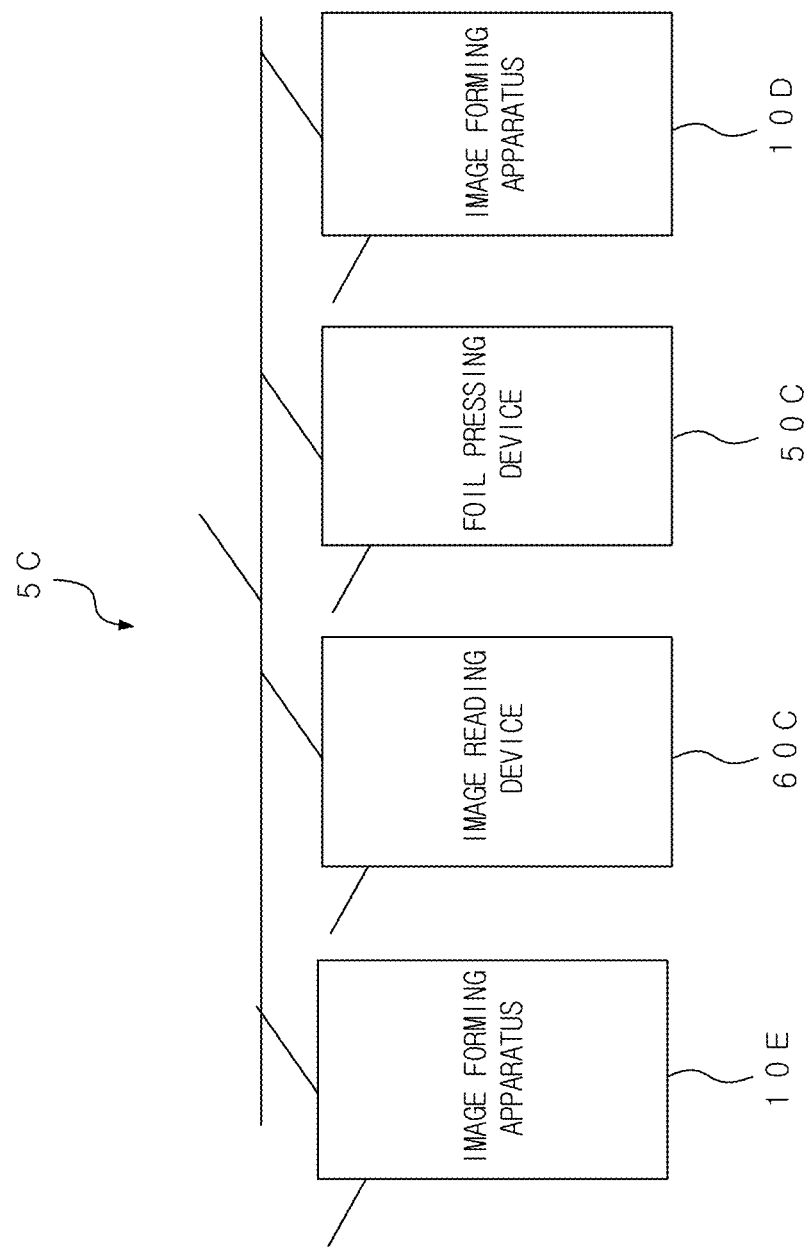

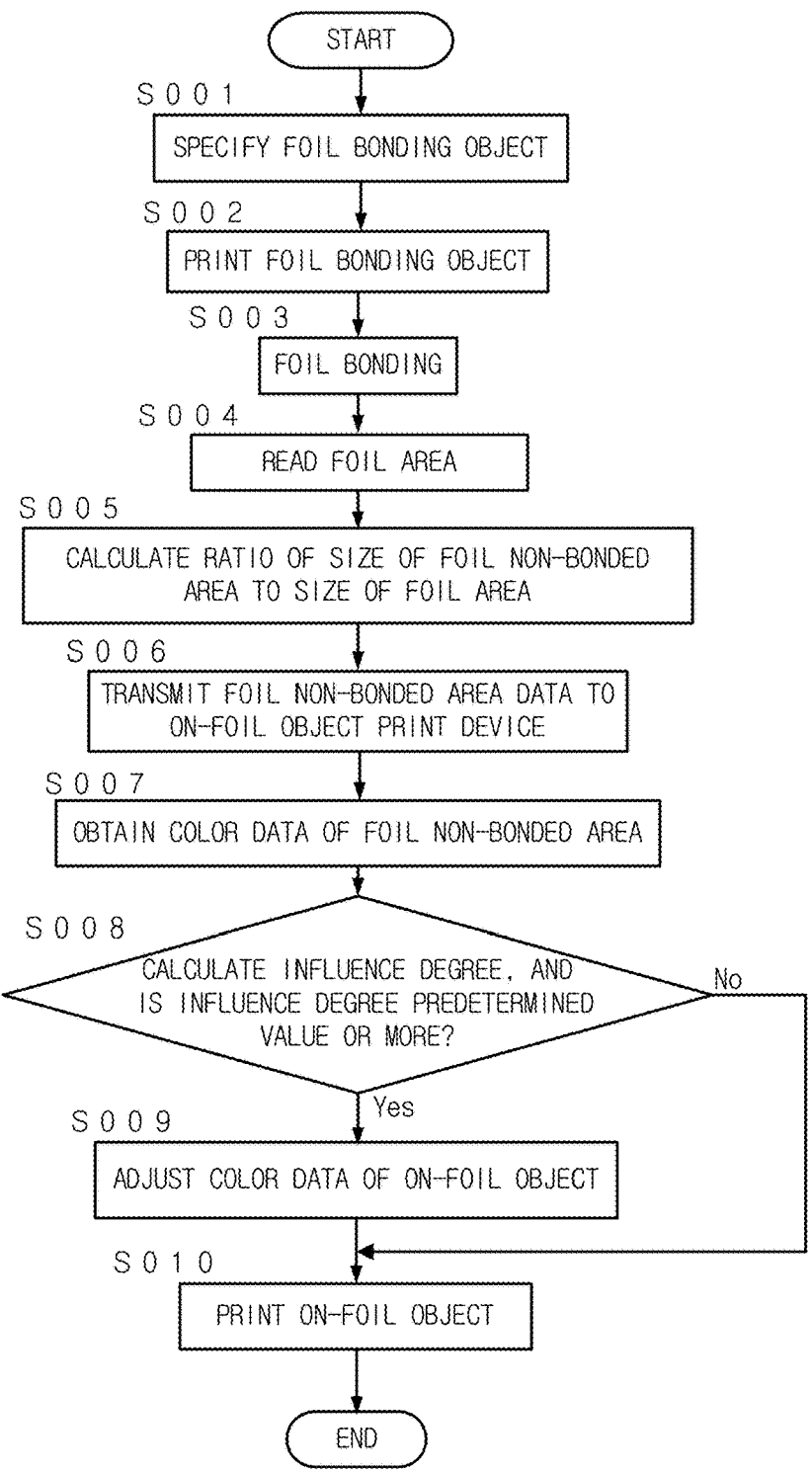

ON-FOIL OBJECT COLOR ADJUSTMENT DEVICE, IMAGE FORMING APPARATUS AND NON-TRANSITORY RECORDING MEDIUM STORING A COMPUTER READABLE PROGRAM

The entire disclosure of Japanese Patent Application No. 2017-118884 filed on Jun. 16, 2017, is incorporated herein by reference in its entirety.

BACKGROUND

The present invention relates to an on-foil object color adjustment device, an image forming apparatus and a non-transitory recording medium storing a computer readable program for adjusting the color of the object to be printed on the foil.

Conventionally, after the foil is bonded on the paper sheet by the foil pressing device, the object (hereinafter, referred to as "on-foil object") is printed on the bonded foil. In general, the foil-bonding is carried out as follows. (1) By using the toner to be treated as the paste in the foil-bonding (hereinafter, referred to as "foil-bonding toner"), the foil-bonding object is printed on the paper sheet. (2) In the foil pressing device, the foil-bonding toner used for printing the foil-bonding object is melt by heating the paper sheet and the foil is bonded on the paper sheet by pressing the foil. (3) By winding the foil which is not bonded on the paper sheet with the roller or the like, the foil is bonded on the part on which the foil-bonding object is printed by using the foil-bonding toner.

In case that the foil is bonded in the above-described process, the bonding ratio of the foil is varied according to the smoothness of the paper sheet. Therefore, the portion at which the foil-bonding toner appears in the area in which the foil is bonded, is caused. In case that the color printing of the on-foil object is carried out on the bonded foil, the appearance of the color of the on-foil object is varied due to the color of the foil-bonding toner at the portion at which the foil-bonding toner appears. Accordingly, it is necessary that the color of the on-foil object to be printed at the portion at which the foil-bonding toner appears is reproduced to the expected color, even if the portion at which the foil-bonding toner appears is caused in the foil-bonding.

For example, in Japanese Patent Application Publication No. 2014-35419, the following method for reproducing the metallic gloss is disclosed. In case that the normal color toner is overlapped on the metallic color material, when the amount of the normal color toner is too large, the gloss feeling of the metallic color material is deteriorated. By limiting the amount of the color toner, the metallic gloss of the metallic color material is reproduced.

In Japanese Patent Application Publication No. 2014-35419, it is disclosed that the metallic gloss of the metallic color material is reproduced. However, it is not disclosed that the color of the on-foil object to be printed on the bonded foil is reproduced. In particular, in Japanese Patent Application Publication No. 2014-35419, it is not considered that the portion at which the foil-bonding toner appears is caused in the area in which the foil is bonded.

SUMMARY

One or more embodiments of the present invention provide an on-foil object color adjustment device, an image forming apparatus and a non-transitory recording medium storing a computer readable program which reproduce the color of the on-foil object to be printed on the bonded foil to the expected color even if the portion at which the foil-bonding toner appears in the area in which the foil-bonding is carried out is caused, in case that the on-foil object is printed on the bonded foil.

According to one or more embodiments of the present invention, an on-foil object color adjustment device comprises:

a data receiver that obtains foil non-bonded area data relating to a foil non-bonded area on which a foil is not bonded in a foil area after a foil-bonding is carried out for a printable recording medium, the foil area being an area in which a foil-bonding object is printed on the printable recording medium by using a foil-bonding toner and in which the foil-bonding is carried out after the foil-bonding object is printed; and a hardware processor that:
calculates a ratio of a size of the foil non-bonded area to a size of the foil area in accordance with (i.e., based on) the size of the foil area and the size of the foil non-bonded area, which is reached from the foil non-bonded area data obtained by the data receiver;
calculates a first influence degree indicating an influence of the foil non-bonded area on a color of an on-foil object to be printed in the foil area after the foil-bonding, in accordance with the calculated ratio, a color of the foil non-bonded area, a color of the foil and color data of the on-foil object; and
adjusts the color data of the on-foil object in accordance with the calculated first influence degree.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a schematic view showing another example of the print system including the image forming apparatus according to one or more embodiments of the invention;

FIG. 6 is a flowchart showing the method for printing the on-foil object in the foil area by the print system according to one or more embodiments of the invention;

DETAILED DESCRIPTION

Hereinafter, one or more embodiments of the present invention will be described with reference to the drawings. However, the scope of the invention is not limited to the disclosed embodiments.

Figure 1:
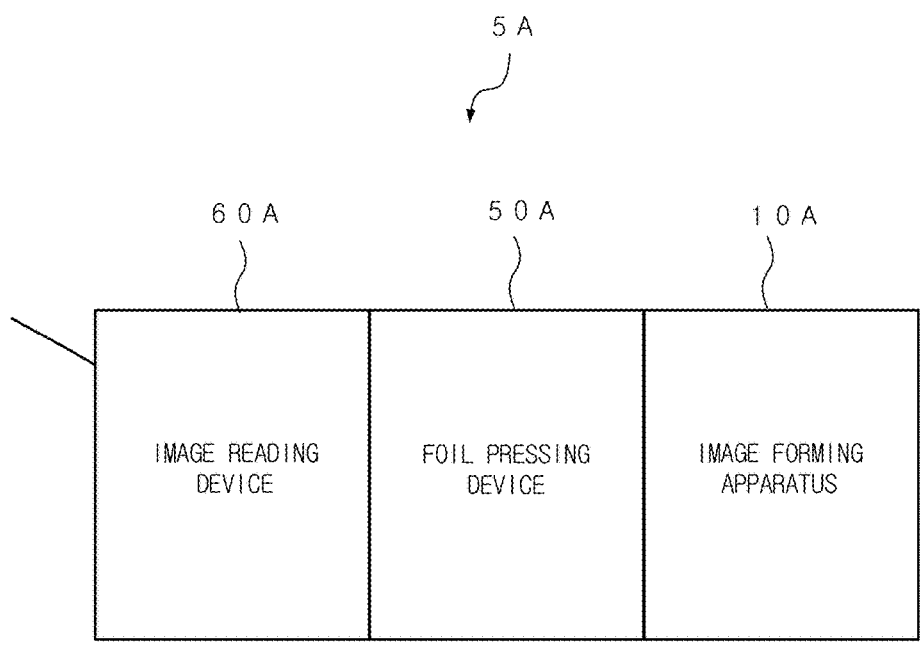
FIG. 1 is a schematic view showing an example of the print system including the image forming apparatus according to one or more embodiments of the invention.

FIG. 1 is a schematic diagram of the print system 5A including the image forming apparatus 10A according to one or more embodiments. The print system 5A comprises the image forming apparatus 10A, a foil pressing device 50A and an image reading device 60A which are connected at the in-line connection.

The image forming apparatus 10A prints the foil-bonding object on the paper sheet (printable recording medium) by using the foil-bonding toner in accordance with the print job transmitted from an external device, such as a client PC (Personal Computer).

Further, the image forming apparatus 10A carries out the printing on the paper sheet on which the foil is bonded by the foil pressing device 50A, in accordance with the transmitted print job. Specifically, after the foil pressing device 50A bonds the foil in the area in which the foil-bonding object is printed by using the foil-bonding toner and in which the foil-bonding is carried out after the foil-bonding object is printed (hereinafter, referred to as "foil area"), the image forming apparatus 10A prints the on-foil object in the foil area in accordance with the print job. Further, the image forming apparatus 10A prints an object (hereinafter, referred to as "normal object") on the area except the foil area in accordance with the above print job after the foil-bonding is carried out by the foil pressing device 50A.

The foil pressing device 50A bonds the foil on the paper sheet on which the foil-bonding object is printed by the image forming apparatus 10A. Specifically, the foil pressing device 50A heats the foil-bonding toner used for printing the foil-bonding object and uses the melt foil-bonding toner as the paste to bond the foil on the paper sheet. Thereby, the foil is bonded on the part on which the foil-bonding object is printed.

The image reading device 60A specifies the foil non-bonded area (hereinafter, referred to as "non-bonded area") on which the foil is not bonded in the foil area, by optically reading the paper sheet on which the foil is bonded after the foil-bonding is carried out in the foil area by the foil pressing device 50A. Then, the image reading device 60A prepares the foil non-bonded area data (hereinafter, referred to as "non-bonded area data") relating to the non-bonded area and transmits the non-bonded area data to the image forming apparatus 10A.

In the print system 5A, in case that the document on which the foil is bonded is prepared, firstly, the image forming apparatus 10A prints the foil-bonding object on the part in which foil-bonding will be carried out. In the printing of the foil-bonding object, the black (K) toner is used.

When the paper sheet on which the foil-bonding object is printed is conveyed to the foil pressing device 50A, the foil pressing device 50A heats the conveyed paper sheet and melts the foil-bonding toner used for the printed foil-bonding object to bond the foil on the paper sheet. Then, by winding the foil which is not bonded on the paper sheet with the roller or the like, the foil is bonded on the part on which the object is printed by using the foil-bonding toner.

When the paper sheet on which the foil is bonded is conveyed to the image reading device 60A, the image reading device 60A specifies the non-bonded area on which the foil is not bonded in the foil area, by optically reading the conveyed paper sheet. Then, the image reading device 60A prepares the non-bonded area data relating to the non-bonded area and transmits the non-bonded area data to the image forming apparatus 10A.

When the paper sheet which is optically read by the image reading device 60A is conveyed to the image forming apparatus 10A again, the image forming apparatus 10A adjusts the color data of the on-foil object to be printed in the foil area in accordance with the non-bonded area data transmitted from the image reading device 60A, and the like, and prints the on-foil object in the foil area. The adjustment of the color data of the on-foil object will be explained below. At the same time, the image forming apparatus 10A prints the normal object on the area except the foil area. Thereby, the document on which the foil is bonded is prepared.

Next, the configuration of the image forming apparatus 10A will be explained.

Figure 2:
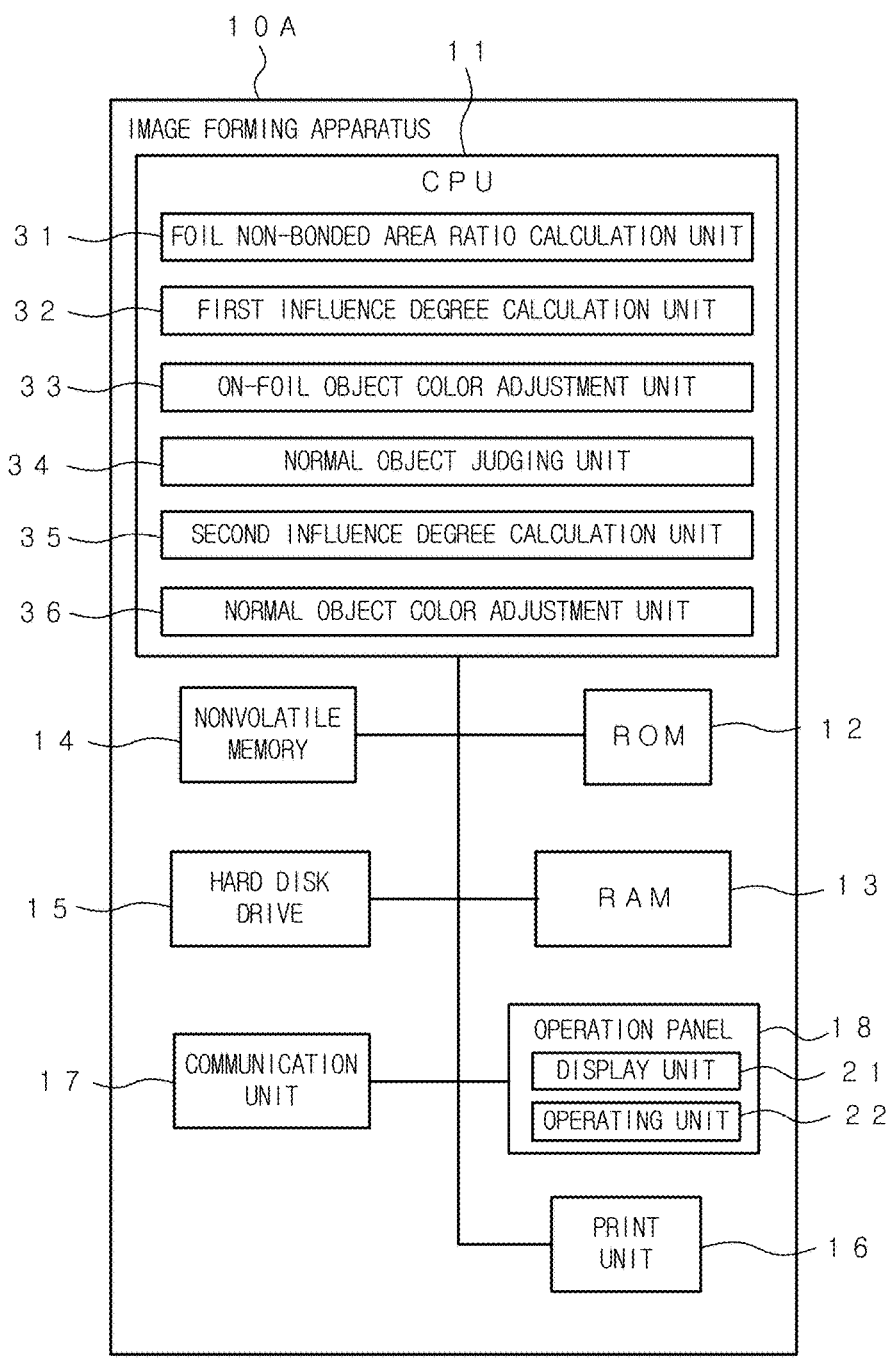
FIG. 2 is a block diagram showing the schematic configuration of the image forming apparatus according to one or more embodiments of the invention.

FIG. 2 is a block diagram showing the schematic configuration of the image forming apparatus 10A.

The image forming apparatus 10A comprises a CPU (Central Processing Unit) 11 for entirely controlling the operation of the image forming apparatus 10A. The CPU 11 having the microprocessor is connected with a ROM (Read Only Memory) 12, a RAM (Random Access Memory) 13, a nonvolatile memory 14, a hard disk drive 15, a print unit 16, a communication unit 17, an operation panel 18 and the like via a bus.

By the CPU 11, a middleware, application programs and the like are executed on an OS (Operating System) program as a base. The CPU 11 controls the operation of whole of the print system 5A as necessary. Further, the CPU 11 has the function of the non-bonded area ratio calculation unit 31, the first influence degree calculation unit 32, the on-foil object color adjustment unit 33, the normal object judging unit 34, the second influence degree calculation unit 35 and the normal object color adjustment unit 36 which will be explained below, as the function of the on-foil object color adjustment device.

In the ROM 12, various types of programs are stored. By executing various types of processes by the CPU 11 in accordance with these programs, each function of the image forming apparatus 10A is realized. Further, in the ROM 12, the programs for executing a series of the control for the image forming apparatus 10A by the CPU 11 are stored.

The RAM 13 is used as a work memory for temporarily storing various data when the CPU 11 executes the process in accordance with the programs, an image memory for storing an image data, and the like.

The nonvolatile memory 14 is a memory (flash memory) in which the stored contents are not damaged even if the image forming apparatus 10A is turned off, and is used for storing various types of settings. The hard disk drive 15 is a large-capacity nonvolatile memory device. In the hard disk drive 15, the OS program, various types of application programs, the print data, the image data, the history relating to the jobs and the like, are stored.

The print unit 16 has the function for printing an image on the paper sheet in accordance with the image data. In one or more embodiments, the print unit 16 is configured as a so-called laser printer which comprises a conveying device for the recording sheet, a photoconductive drum, a charging device, a laser unit, a developing device, a transfer and separation device, a cleaning device and the fixing device, and which forms an image by the electrophotographic process.

The communication unit 17 has the function for communicating the data with the client PC and other external devices via the network, such as LAN (Local Area Network) or the like. Further, the communication unit 17 has the function as the non-bonded area data obtaining unit for obtaining the non-bonded area data from the image reading device 60A.

The operation panel 18 comprises a display unit 21 and an operating unit 22. The operating unit 22 comprises a switch unit, such as a start button and the like, and a touch panel. The display unit 21 comprises a liquid crystal display (LCD) and the like, and has the function for displaying various types of operation windows, setting windows and the like.

When the data indicating the size of the non-bonded area is included in the non-bonded area data obtained from the image reading device 60A, the non-bonded area ratio calculation unit 31 calculates the ratio of the size of the non-bonded area to the size of the foil area in accordance with the size of the foil area and the size of the non-bonded area.

The first influence degree calculation unit 32 calculates the influence degree indicating the influence of the foil-bonding toner which appears in the non-bonded area, on the color of the on-foil object, in accordance with the ratio calculated by the non-bonded area ratio calculation unit 31 or the data indicating the ratio of the size of the non-bonded area to the size of the foil area, which is included in the non-bonded area data received from the image reading device 60A, the color of the non-bonded area in the foil area, the color of the foil and the color data of the on-foil object to be printed in the foil area after the foil-bonding.

The on-foil object color adjustment unit 33 adjusts the color data of the on-foil object in accordance with the influence degree calculated by the first influence degree calculation unit 32.

The normal object judging unit 34 judges whether the normal object to be printed around the foil area (for example, within five pixels from the edge of the foil area) exists in accordance with the print job received from an external device or the like.

In case that the normal object judging unit 34 judges that the normal object to be printed around the foil area exists, the second influence degree calculation unit 35 calculates the influence degree indicating the influence of the non-bonded area and the normal object on the color of the on-foil object, in accordance with the ratio of the size of the non-bonded area in the foil area to the size of the foil area, the color of the non-bonded area in the foil area, the color of the foil used in the foil area, the color data of the on-foil object to be printed in the foil area after the foil-bonding and the normal object to be printed around the foil area.

The normal object color adjustment unit 36 adjusts the color data of the normal object to be printed around the foil area, in accordance with the influence degree calculated by the second influence degree calculation unit 35.

Figure 3:
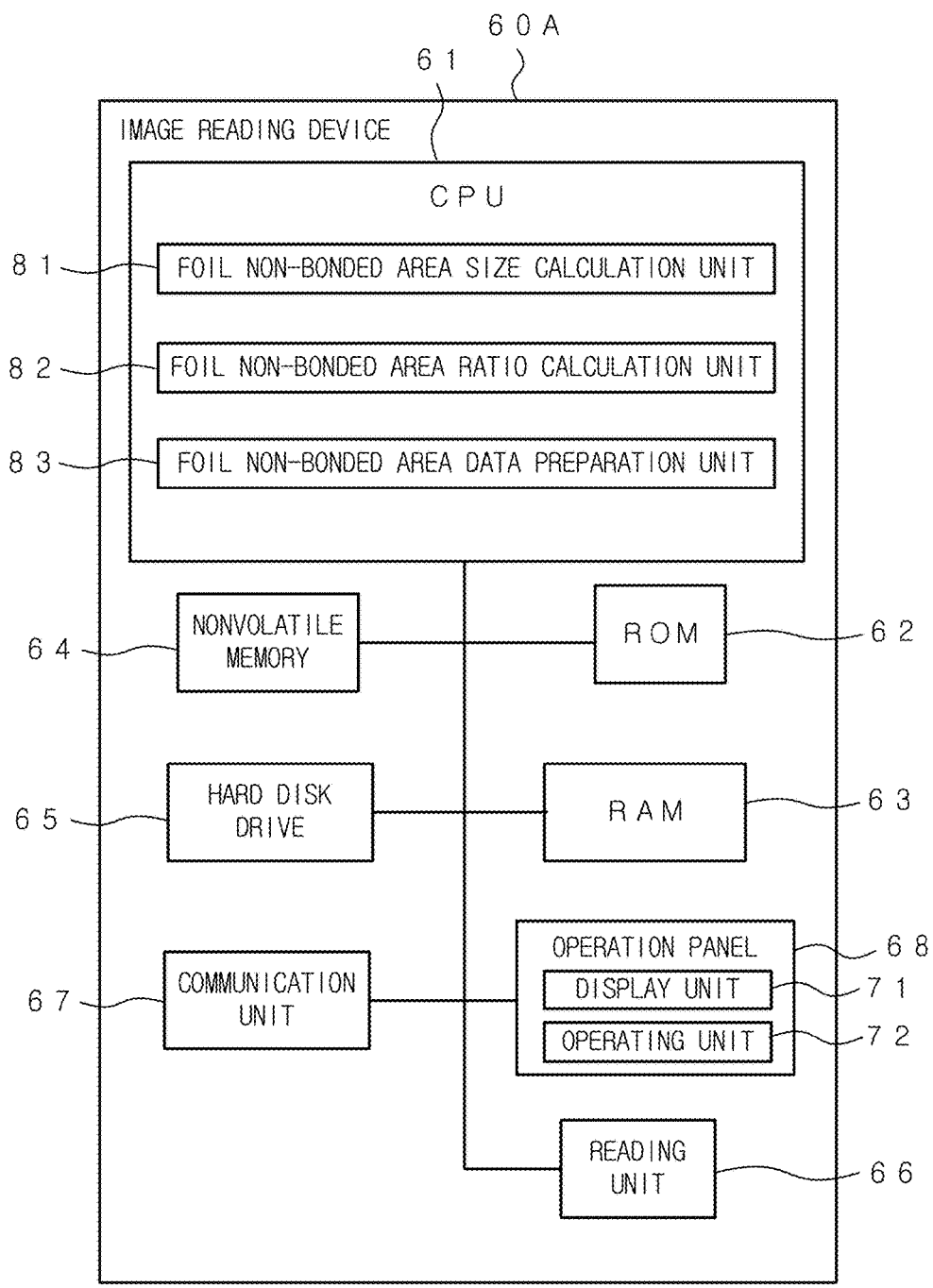
FIG. 3 is a block diagram showing the schematic configuration of the image reading device according to one or more embodiments of the invention.

FIG. 3 is a block diagram showing the schematic configuration of the image reading device 60A.

The image reading device 60A comprises a CPU 61 for entirely controlling the operation of the image reading device 60A. The CPU 61 having the microprocessor is connected with a ROM 62, a RAM 63, a nonvolatile memory 64, a hard disk drive 65, a reading unit 66, a communication unit 67, an operation panel 68 and the like via a bus.

By the CPU 61, a middleware, application programs and the like are executed on an OS program as a base. Further, the CPU 61 has the function of the non-bonded area size calculation unit 81, the non-bonded area ratio calculation unit 82 and the non-bonded area data preparation unit 83.

In the ROM 62, various types of programs are stored. By executing various types of processes by the CPU 61 in accordance with these programs, each function of the image reading device 60A is realized. Further, in the ROM 62, the programs for executing a series of the control for the image reading device 60A by the CPU 61 are stored.

The RAM 63 is used as a work memory for temporarily storing various data when the CPU 61 executes the process in accordance with the programs, and the like.

The nonvolatile memory 64 is a memory (flash memory) in which the stored contents are not damaged even if the image reading device 60A is turned off, and is used for storing various types of settings. The hard disk drive 65 is a large-capacity nonvolatile memory device. In the hard disk drive 65, the OS program, various types of application programs, the print data, the image data and the like, are stored.

The reading unit 66 has the function for obtaining the image data by optically reading the paper sheet on which the foil is bonded. For example, the reading unit 66 comprises a light source for irradiating a paper sheet with light, a line image sensor for reading the paper sheet line by line in the width direction of the paper sheet by receiving the reflected light from the paper sheet, a moving unit for sequentially moving the reading position line by line in the longitudinal direction of the paper sheet, an optical system having lenses, mirrors, and the like for guiding the reflected light from the paper sheet to the line image sensor and focusing the reflected light on the line image sensor, a converting unit for converting an analog image signal outputted from the line image sensor into digital image data, and the like.

The communication unit 67 has the function for communicating the data with the client PC and other external devices via the network, such as LAN or the like. Further, the communication unit 67 has the function for transmitting the non-bonded area data prepared by the non-bonded area data preparation unit 83, to the image forming apparatus 10A.

The operation panel 68 comprises a display unit 71 and an operating unit 72. The operating unit 72 comprises a switch unit, such as a start button and the like, and a touch panel. The display unit 71 comprises a liquid crystal display and the like, and displays various types of operation windows, setting windows and the like.

The non-bonded area size calculation unit 81 recognizes the non-bonded area in the foil area from the image data obtained by optically reading the paper sheet on which the foil is bonded and calculates the size of the non-bonded area. In case that two or more non-bonded areas exist, the total of the sizes thereof is calculated. The size of the non-bonded area includes the size of the non-bonded area in the whole of the paper sheet, the size of the non-bonded area in each foil area in case that two or more foil areas exist in the paper sheet, the size of the non-bonded area in each of the foil division areas (for example, the area having 5 pixels×5 pixels) obtained by dividing the foil area, and the like.

The non-bonded area ratio calculation unit 82 calculates the ratio of the size of the non-bonded area to the size of the foil area in accordance with the size of the foil area and the size of the non-bonded area, which is calculated by the non-bonded area size calculation unit 81. The ratio of the size of the non-bonded area to the size of the foil area includes the ratio of the size of the non-bonded area in the whole of the paper sheet to the size of the foil area in the whole of the paper sheet, the ratio of the size of the non-bonded area in each foil area to the size of the foil area in case that two or more foil areas exist in the paper sheet, the ratio of the size of the non-bonded area in each foil division area to the size of the foil division area, and the like.

The non-bonded area data preparation unit 83 prepares the non-bonded area data relating to the non-bonded area, in accordance with the size of the non-bonded area, which is calculated by the non-bonded area size calculation unit 81 or the above ratio which is calculated by the non-bonded area ratio calculation unit 82. The non-bonded area data relating to the non-bonded area includes the data indicating the size of the non-bonded area, which is described above, or the ratio of the size of the non-bonded area to the size of the foil area, which is described above.

Figure 4:
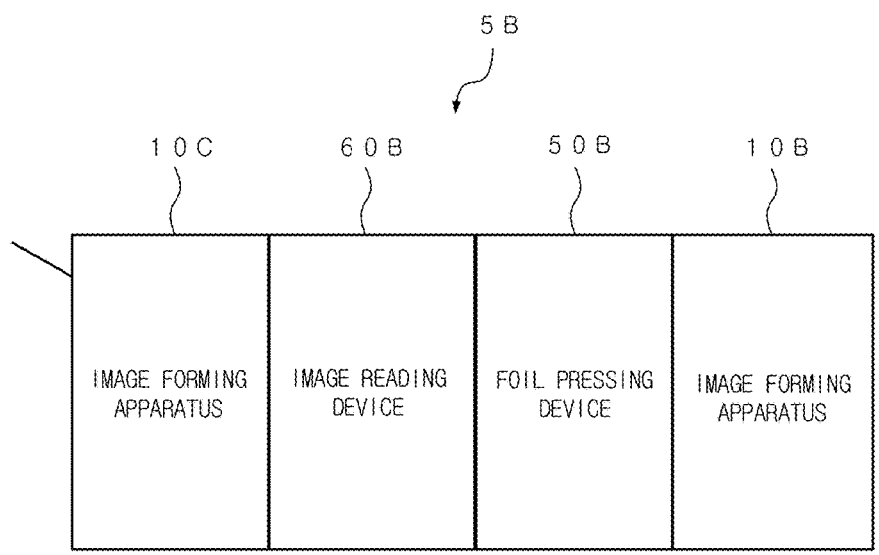
FIG. 4 is a schematic view showing another example of the print system including the image forming apparatus according to one or more embodiments of the invention.

FIG. 4 shows the schematic configuration of the print system 5B including the image forming apparatuses 10B and 10C. The print system 5B comprises the image forming apparatus 10B, the foil pressing device 50B, the image reading device 60B and the image forming apparatus 10C. The image forming apparatus 10B, the foil pressing device 50B, the image reading device 60B and the image forming apparatus 10C are connected in this order at the direct tandem system.

In the print system 5B, in case that the document on which the foil is bonded is prepared, firstly, the image forming apparatus 10B prints the foil-bonding object on the part in which foil-bonding will be carried out.

When the paper sheet on which the foil-bonding object is printed is conveyed to the foil pressing device 50B, the foil pressing device 50B carries out the foil-bonding in the part on which the foil-bonding object is printed by using the foil-bonding toner, similarly to the foil pressing device 50A.

When the paper sheet on which the foil is bonded is conveyed to the image reading device 60B, the image reading device 60B specifies the non-bonded area on which the foil is not bonded in the foil area, by optically reading the conveyed paper similarly to the image reading device 60A. Then, the image reading device 60B prepares the non-bonded area data relating to the non-bonded area and transmits the non-bonded area data to the image forming apparatus 10C.

When the paper sheet which is optically read by the image reading device 60B is conveyed to the image forming apparatus 10C, the image forming apparatus 10C adjusts the color data of the on-foil object to be printed in the foil area in accordance with the non-bonded area data transmitted from the image reading device 60B, and the like, and prints the on-foil object in the foil area. At the same time, the image forming apparatus 10C prints the normal object on the area except the foil area. Thereby, the document on which the foil is bonded is prepared.

In the print system 5B, the foil pressing device 50B and the image reading device 60B have the same configurations as the foil pressing device 50A and the image reading device 60A of the print system 5A, respectively. Further, each of the image forming apparatus 10B and the image forming apparatus 10C has the same configuration as the image forming apparatus 10A of the print system 5A. However, because the image forming apparatus 10B is one for printing the foil-bonding object on the paper sheet, it is not necessary that the CPU 11 of the image forming apparatus 10B has the function of the non-bonded area ratio calculation unit 31, the first influence degree calculation unit 32, the on-foil object color adjustment unit 33, the normal object judging unit 34, the second influence degree calculation unit 35 and the normal object color adjustment unit 36.

FIG. 5 shows the schematic configuration of the print system 5C including the image forming apparatuses 10D and 10E. The print system 5C comprises the image forming apparatus 10D, the foil pressing device 50C, the image reading device 60C and the image forming apparatus 10E. The image forming apparatus 10D, the foil pressing device 50C, the image reading device 60C and the image forming apparatus 10E are connected with each other via the network. However, the image forming apparatus 10D, the foil pressing device 50C, the image reading device 60C and the image forming apparatus 10E are not physically connected with each other.

In the print system 5C, in case that the document on which the foil is bonded is prepared, firstly, the image forming apparatus 10D prints the foil-bonding object on the part in which foil-bonding will be carried out.

When the paper sheet on which the foil-bonding object is printed is output from the image forming apparatus 10D, a worker feeds the output paper sheet to the foil pressing device 50C manually. The foil pressing device 50C carries out the foil-bonding in the part on which the foil-bonding object is printed by using the foil-bonding toner, similarly to the foil pressing device 50A.

Then, the worker feeds the paper sheet on which the foil is bonded by the foil pressing device 50C, to the image reading device 60C manually. The image reading device 60C specifies the non-bonded area on which the foil is not bonded in the foil area, by optically reading the fed paper similarly to the image reading device 60A. Then, the image reading device 60C prepares the non-bonded area data relating to the non-bonded area and transmits the non-bonded area data to the image forming apparatus 10E.

Then, the worker feeds the paper sheet which is optically read by the image reading device 60C, to the image forming apparatus 10E manually. The image forming apparatus 10E adjusts the color data of the on-foil object to be printed in the foil area in accordance with the non-bonded area data transmitted from the image reading device 60C, and the like, and prints the on-foil object in the foil area. At the same time, the image forming apparatus 10E prints the normal object on the area except the foil area. Thereby, the document on which the foil is bonded is prepared.

In the print system 5C, the foil pressing device 50C and the image reading device 60C have the same configurations as the foil pressing device 50A and the image reading device 60A of the print system 5A, respectively. Further, each of the image forming apparatus 10D and the image forming apparatus 10E has the same configuration as the image forming apparatus 10A of the print system 5A. However, because the image forming apparatus 10D is one for printing the foil-bonding object on the paper sheet, it is not necessary that the CPU 11 of the image forming apparatus 10D has the function of the non-bonded area ratio calculation unit 31, the first influence degree calculation unit 32, the on-foil object color adjustment unit 33, the normal object judging unit 34, the second influence degree calculation unit 35 and the normal object color adjustment unit 36.

Next, the method for adjusting the color data of the on-foil object by each of the print systems 5A, 5B and 5C (hereinafter, also collectively referred to as "print system 5"), will be explained.

FIG. 6 is a flowchart showing the method for printing the on-foil object in the foil area by the print system 5.

Firstly, when the print system 5 receives the print job from a client PC or the like, the image forming apparatus 10A, 10B or 10D (hereinafter, also referred to as "foil-bonding object print device) carries out the rasterizing process for the foil-bonding object data included in the print job. Then, the foil-bonding object print device specifies the foil-bonding object to be printed from the page data prepared by the rasterizing process (Step S001).

Then, the foil-bonding object print device prints the foil-bonding object specified in Step S001 on the paper sheet (Step S002).

The foil pressing device 50A, 50B or 50C (hereinafter, also collectively referred to as "foil pressing device 50") carries out the foil-bonding in the part (foil area) on which the foil-bonding object is printed by the foil-bonding object print device (Step S003).

The image reading device 60A, 60B or 60C (hereinafter, also collectively referred to as "image reading device 60") recognizes the non-bonded area in the foil area from the image data obtained by optically reading the paper sheet on which the foil is bonded (Step S004). Then, the image reading device 60 calculates the size of the recognized non-bonded area.

Further, the image reading device 60 calculates the ratio of the size of the non-bonded area to the size of the foil area in accordance with the size of the foil area and the calculated size of the non-bonded area (Step S005) and prepares the non-bonded area data including the data indicating the calculated ratio. Then, the image reading device 60 transmits the non-bonded area data to the image forming apparatus 10A, 10C or 10E (hereinafter, also collectively referred to as "on-foil object print device") (Step S006).

The on-foil object print device receives the non-bonded area data and obtains the color data of the non-bonded area (Step S007).

As a method for obtaining the color data of the non-bonded area, for example, because the color of the non-bonded area is basically the color of the foil-bonding toner, the on-foil object print device may obtain the color information of the foil-bonding toner used by the foil-bonding object print device as the color data of the non-bonded area. Alternatively, the image reading device 60 may obtain the color data of the current non-bonded area when the image reading device 60 optically reads the paper sheet on which the foil is bonded, and the on-foil object print device may receive the non-bonded area data including the color data of the current non-bonded area from the image reading device 60.

The on-foil object print device calculates the influence degree indicating the influence of the non-bonded area on the color of the on-foil object, in accordance with the data indicating the calculated ratio included in the non-bonded area data received from the image reading device 60, the color of the non-bonded area in the foil area, the color of the foil and the color data of the on-foil object to be printed in the foil area after the foil-bonding. Then, the on-foil object print device judges whether the calculated influence degree is the predetermined threshold value or more (Step S008).

Figure 7A:
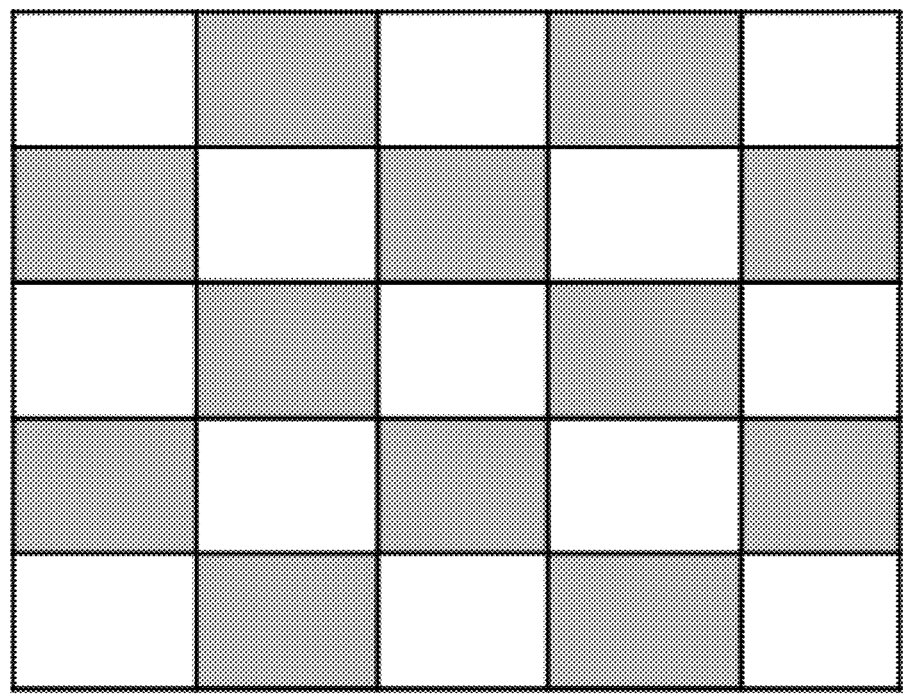
FIGS. 7A and 7B are explanatory views for schematically showing the situation in which the on-foil object is printed in the foil area after the foil-bonding according to one or more embodiments of the invention.
Figure 7B:
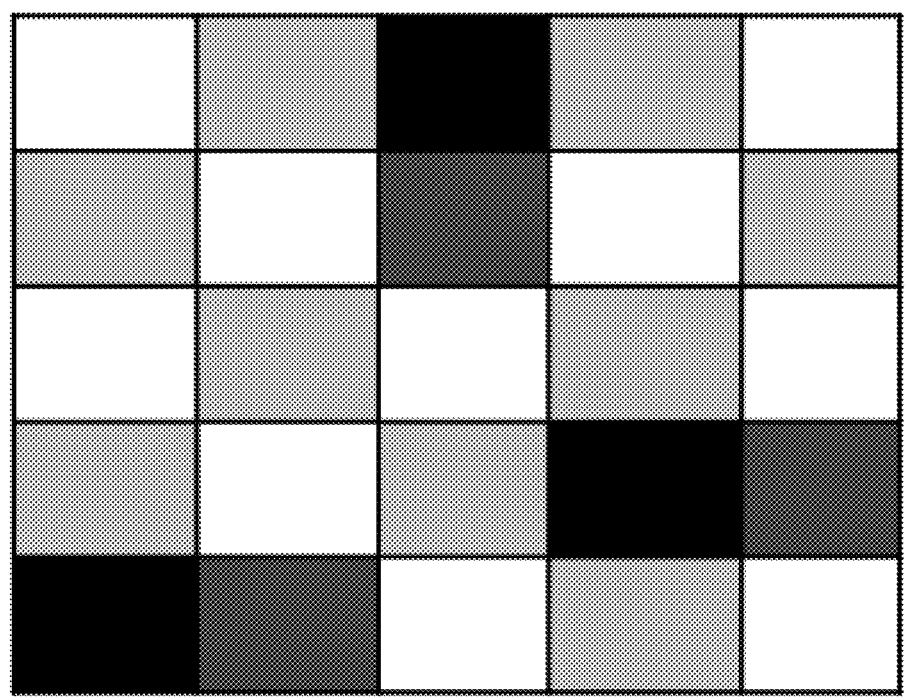

FIGS. 7A and 7B are explanatory views for schematically showing the situation in which the on-foil object is printed in the foil area after the foil-bonding. FIG. 7A shows the situation in which the on-foil object is printed in the foil area in which the non-bonded area is not caused after the foil-bonding. FIG. 7B shows the situation in which the on-foil object is printed in the foil area in which the non-bonded area is caused after the foil-bonding. In each of FIGS. 7A and 7B, one box corresponds to 1 pixel.

In FIG. 7A, after the foil-bonding, the on-foil object is printed in the foil area in which the non-bonded area is not caused. On the other hand, in FIG. 7B, the non-bonded area is caused in the foil area when the foil is bonded, and then the on-foil object is printed in the foil area. In these drawings, the white part indicates the part in which the foil is bonded and the on-foil object is not printed. The light gray part indicates the part in which the foil is bonded and the on-foil object is printed. Further, the black part indicates the part in which the foil is not bonded (non-bonded area) and the on-foil object is not printed. The dark gray part indicates the part which is the non-bonded area and in which the on-foil object is printed.

In one or more embodiments, because the black (K) toner is used for the printing of the foil-bonding object, when the non-bonded area is caused, the brightness of the color of the on-foil object is decreased as compared with the case of FIG. 7A.

Therefore, before the printing of the on-foil object, the on-foil object print device calculates the influence degree indicating the influence of the non-bonded area on the color of the on-foil object (in one or more embodiments, the change in the brightness of the on-foil object due to the non-bonded area) in accordance with the ratio of the size of the non-bonded area to the size of the foil area, the color of the non-bonded area in the foil area (for example, the color of the foil-bonding toner, in one or more embodiments, black (K)), the color of the foil used in the foil area and the color data of the on-foil object to be printed in the foil area after the foil-bonding (Step S008). For example, as the influence degree calculated in Step S008, in case that the on-foil object print device judges that the brightness of the color of the on-foil object is decreased by 5% when the on-foil object is printed in the foil area as compared with the case in which the non-bonded area is not caused, the on-foil object print device calculates the above influence degree as 5%.

Then, in case that it is judged that the influence degree calculated in Step S008 is less than the predetermined threshold value (for example, in case of the brightness, 3%) (Step S008; No), the process proceeds to Step S010.

On the other hand, in case that it is judged that the calculated influence degree is the predetermined threshold value or more (Step S008; Yes), the on-foil object print device adjusts the color data of the on-foil object in accordance with the calculated influence degree (Step S009).

For example, when the on-foil object print device judges that the brightness of the color of the on-foil object is decreased by 5% as described above, the on-foil object print device adjusts the color data of the on-foil object so as to increase the brightness of the color of the on-foil object by 5% by reducing the K component from the color data of the on-foil object, which is set in the print job or the like.

Then, the on-foil object print device prints the on-foil object in the foil area in accordance with the color data of the on-foil object (Step S010). The process is ended.

According to the method for adjusting the color data of the on-foil object as described above, even if the non-bonded area is caused in the foil area at the foil-bonding, the color data of the on-foil object is adjusted so as to eliminate the influence of the non-bonded area on the on-foil object. Thereby, it is possible to reproduce the color of the on-foil object to the expected color.

Next, the method for adjusting the color data of each on-foil object in case that two or more foil areas exist in the paper sheet, and the method for recognizing the paper sheet on which the foil is bonded as the wasted paper sheet, will be explained.

Figure 8:
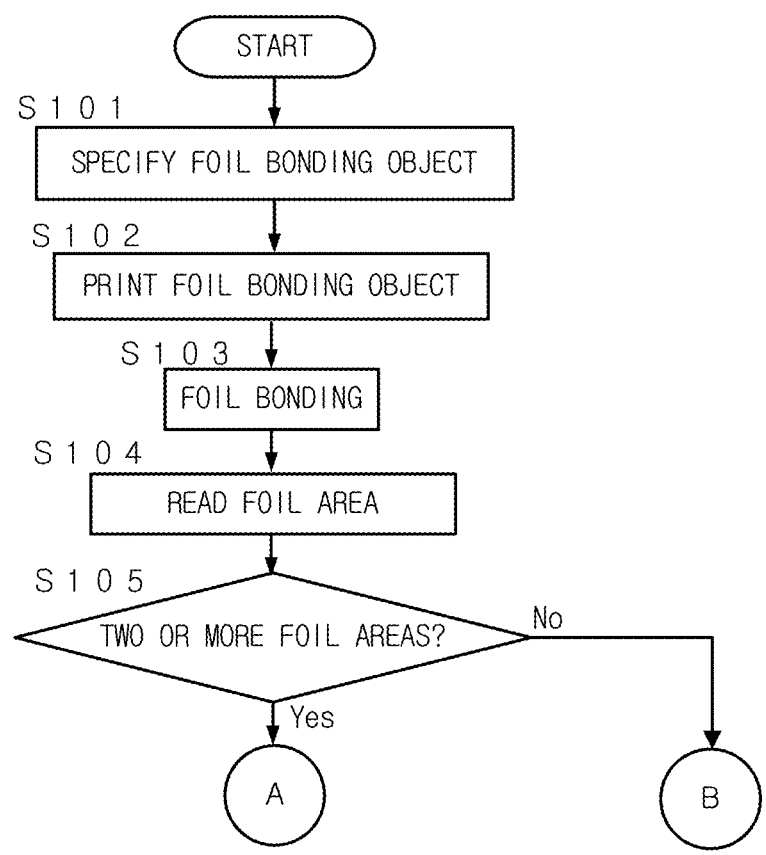
FIGS. 8, 9 and 10 are a flowchart showing the method for printing the on-foil object in the foil area and the method for recognizing the paper sheet on which the foil is bonded as the wasted paper sheet by the print system according to one or more embodiments of the invention.
Figure 9:
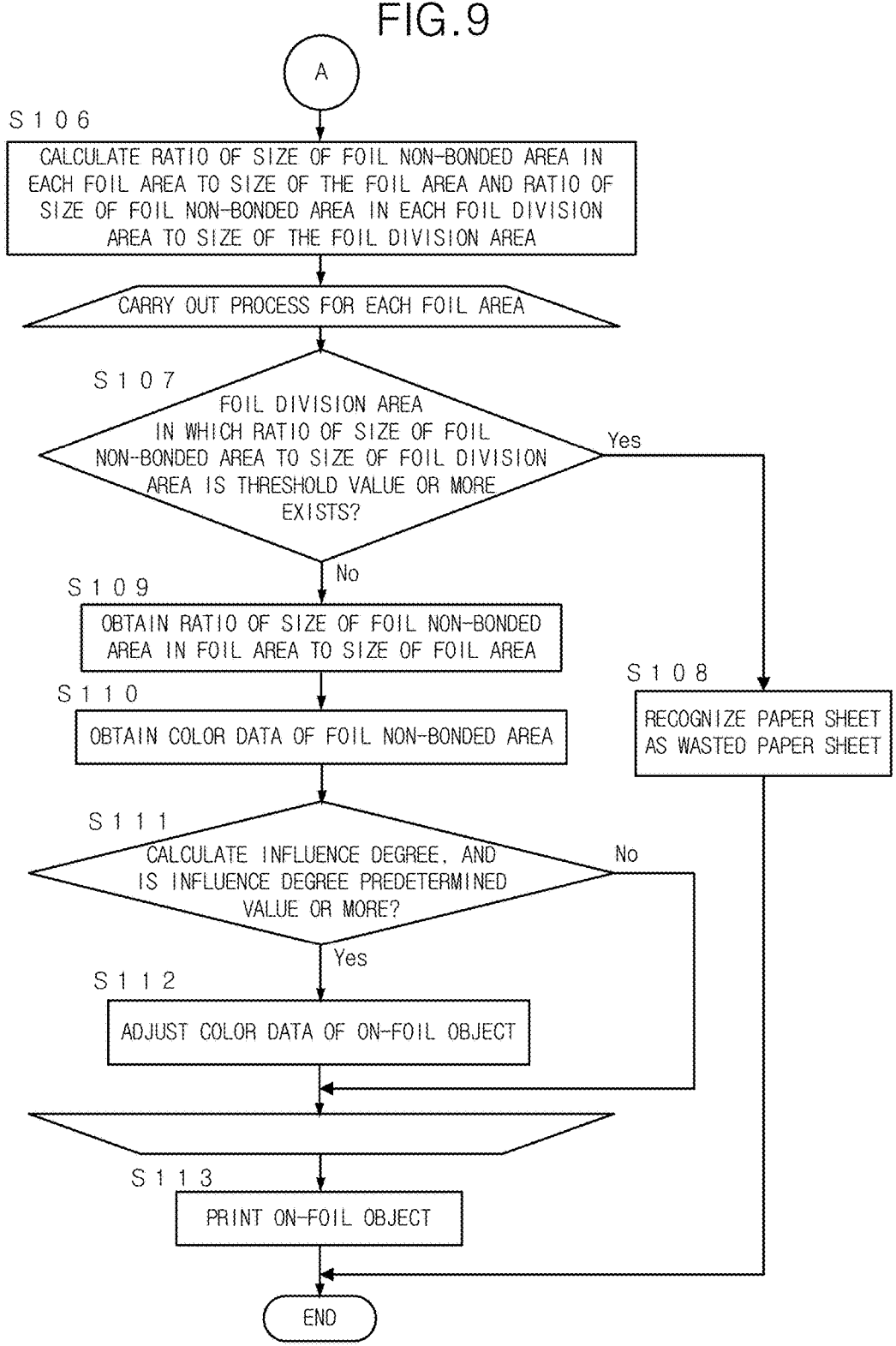
Figure 10:
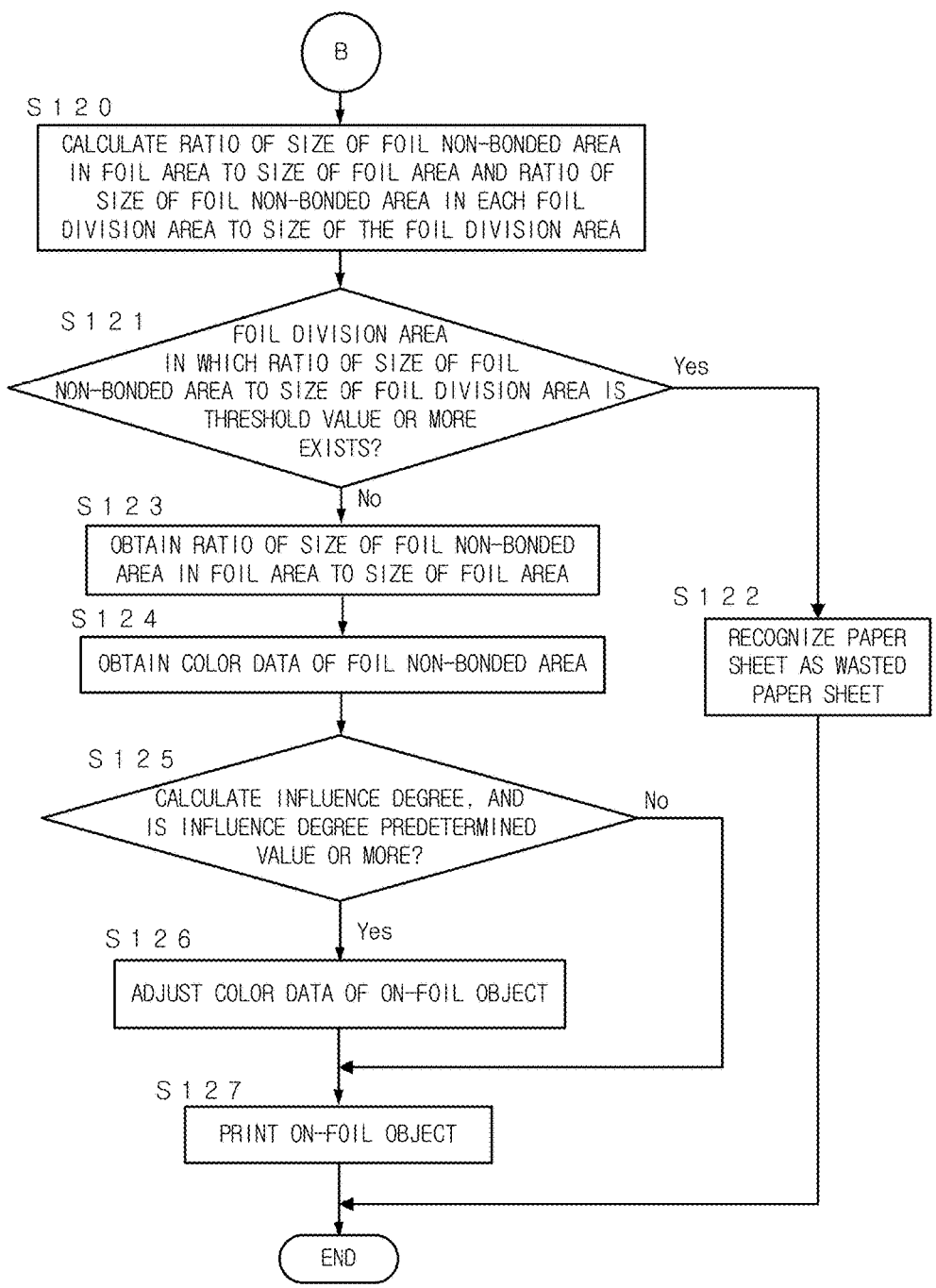

FIGS. 8, 9 and 10 are a flowchart showing the method for printing the on-foil object in the foil area and the method for recognizing the paper sheet on which the foil is bonded as the wasted paper sheet by the print system 5.

Firstly, when the print system 5 receives the print job from a client PC or the like, the foil-bonding object print device carries out the rasterizing process for the foil-bonding object data included in the print job. Further, the foil-bonding object print device specifies the foil-bonding object to be printed from the page data prepared by the rasterizing process (Step S101 in FIG. 8).

Then, the foil-bonding object print device prints the foil-bonding object specified in Step S101, on the paper sheet Step S102).

The foil pressing device 50 carries out the foil-bonding in the part (foil area) on which the foil-bonding object is printed by the foil-bonding object print device (Step S103).

The image reading device 60 recognizes the non-bonded area in the foil area from the image data obtained by optically reading the paper sheet for which the foil-bonding is carried out (Step S104).

Further, the image reading device 60 judges whether two or more foil areas exist in the paper sheet in accordance with the print job or the result of the optical reading of the paper sheet (Step S105). When it is judged that only one foil area exists in the paper sheet (Step S105; No), the process proceeds to Step S120 (See FIG. 10).

On the other hand, when it is judged that two or more foil areas exist in the paper sheet (Step S105; Yes), the image reading device 60 calculates the size of the non-bonded area in each foil area and the size of the non-bonded area in each of the foil division areas obtained by dividing each foil area. Then, the image reading device 60 calculates the ratio of the size of the non-bonded area in the foil area to the size of the foil area, for each foil area in accordance with the size of each foil area and the size of the non-bonded area in each foil area. Further, the image reading device 60 calculates the ratio of the size of the non-bonded area in the foil division area to the size of the foil division area, for each foil division area in accordance with the size of the non-bonded area in each foil division area (Step S106 in FIG. 9). Then, the image reading device 60 transmits the non-bonded area data including each calculated ratio to the on-foil object print device.

In accordance with the non-bonded area data received from the image reading device 60, the on-foil object print device judges whether the ratio of the size of the non-bonded area in the foil division area to the size of the foil division area is the predetermined threshold value or less, for all of the foil division areas in one foil area (Step S107).

In case that the on-foil object print device judges that the foil division area in which the above ratio is more than the predetermined threshold value exists (Step S107; Yes), the on-foil object print device recognizes this paper sheet as the wasted paper sheet (Step S108). For example, in case that the size of the non-bonded area in the foil division area having 5 pixels×5 pixels is not less than ⅓ of the size of this foil division area, the on-foil object print device recognizes this paper sheet as the wasted paper sheet. Then, the process is ended.

On the other hand, in case that the on-foil object print device judges that the ratio of the size of the non-bonded area in the foil division area to the size of the foil division area is the predetermined threshold value or less for all of the foil division areas (Step S107; No), the on-foil object print device obtains the ratio of the size of the non-bonded area in the foil area to the size of the foil area (Step S109), and obtains the color data of the non-bonded area in the foil area (Step S110).

The on-foil object print device calculates the influence degree indicating the influence of the non-bonded area in the foil area on the color of the on-foil object in accordance with the ratio of the size of the non-bonded area in the foil area to the size of the foil area, the color of the non-bonded area in the foil area, the color of the foil used in the foil area and the color data of the on-foil object to be printed in the foil area after the foil-bonding. Then, the on-foil object print device judges whether the calculated influence degree is the predetermined threshold value or more (Step S111).

In case that the influence degree calculated in Step S111 is less than the predetermined threshold value (Step S111; No), the process returns to Step S107. Then, the process indicated from Step S107 to Step S112 is carried out for the next foil area.

On the other hand, in case that the on-foil object print device judges that the calculated influence degree is the predetermined threshold value or more (Step S111; Yes), the on-foil object print device adjusts the color data of the on-foil object in accordance with the influence degree (Step S112). Then, the process returns to Step S107, and the process indicated from Step S107 to Step S112 is carried out for the next foil area.

When the process indicated from Step S107 to Step S112 is carried out for all of the foil areas, the on-foil object print device prints the on-foil object in each foil area in accordance with the color data of the on-foil objects (Step S113). Then, the process is ended.

On the other hand, when the image reading device 60 judges that only one foil area exists in the paper sheet in Step S105 (Step S105; No in FIG. 8), the image reading device 60 calculates the size of the non-bonded area in the whole of the paper sheet and the size of the non-bonded area in each foil division area. Then, the image reading device 60 calculates the ratio of the size of the non-bonded area to the size of the foil area in accordance with the size of the foil area and the size of the non-bonded area in the whole of the paper sheet. Further, the image reading device 60 calculates the ratio of the size of the non-bonded area in the foil division area to the size of the foil division area, for each foil division area in accordance with the size of the non-bonded area in each foil division area (Step S120 in FIG. 10). Then, the image reading device 60 transmits the non-bonded area data including each calculated ratio to the on-foil object print device.

In accordance with the non-bonded area data received from the image reading device 60, the on-foil object print device judges whether the ratio of the size of the non-bonded area in the foil division area to the size of the foil division area is the predetermined threshold value or less, for all of the foil division areas (Step S121).

In case that the on-foil object print device judges that the foil division area in which the above ratio is more than the predetermined threshold value exists (Step S121; Yes), the on-foil object print device recognizes this paper sheet as the wasted paper sheet (Step S122).

On the other hand, in case that the on-foil object print device judges that the ratio of the size of the non-bonded area in the foil division area to the size of the foil division area is the predetermined threshold value or less for all of the foil division areas (Step S121; No), the on-foil object print device obtains the ratio of the size of the non-bonded area to the size of the foil area (Step S123), and obtains the color data of the non-bonded area (Step S124).

The on-foil object print device calculates the influence degree indicating the influence of the non-bonded area on the color of the on-foil object in accordance with the ratio of the size of the non-bonded area to the size of the foil area, the color of the non-bonded area in the foil area, the color of the foil used in the foil area and the color data of the on-foil object to be printed in the foil area after the foil-bonding. Then, the on-foil object print device judges whether the calculated influence degree is the predetermined threshold value or more (Step S125).

In case that the influence degree calculated in Step S125 is less than the predetermined threshold value (Step S125; No), the process proceeds to Step S127.

On the other hand, in case that the on-foil object print device judges that the calculated influence degree is the predetermined threshold value or more (Step S125; Yes), the on-foil object print device adjusts the color data of the on-foil object in accordance with the influence degree (Step S126).

Then, the on-foil object print device prints the on-foil object in the foil area in accordance with the color data of the on-foil object (Step S127), and the process is ended.

According to the method for adjusting the color data of the on-foil object and the method for recognizing the paper sheet on which the foil is bonded as the wasted paper sheet, in case that two or more foil areas exist in the paper sheet, for each foil area, it is possible to adjust the color data of the on-foil object to be printed in the foil area. Further, in case that the non-bonded area is concentratedly caused in a narrow area when the foil-bonding is carried out for the paper sheet, it is possible to recognize the paper sheet as the wasted paper sheet.

Next, the method for adjusting the color data of the on-foil object and the color data of the normal object in case that the normal object to be printed around the foil area exists, will be explained.

Figure 11:
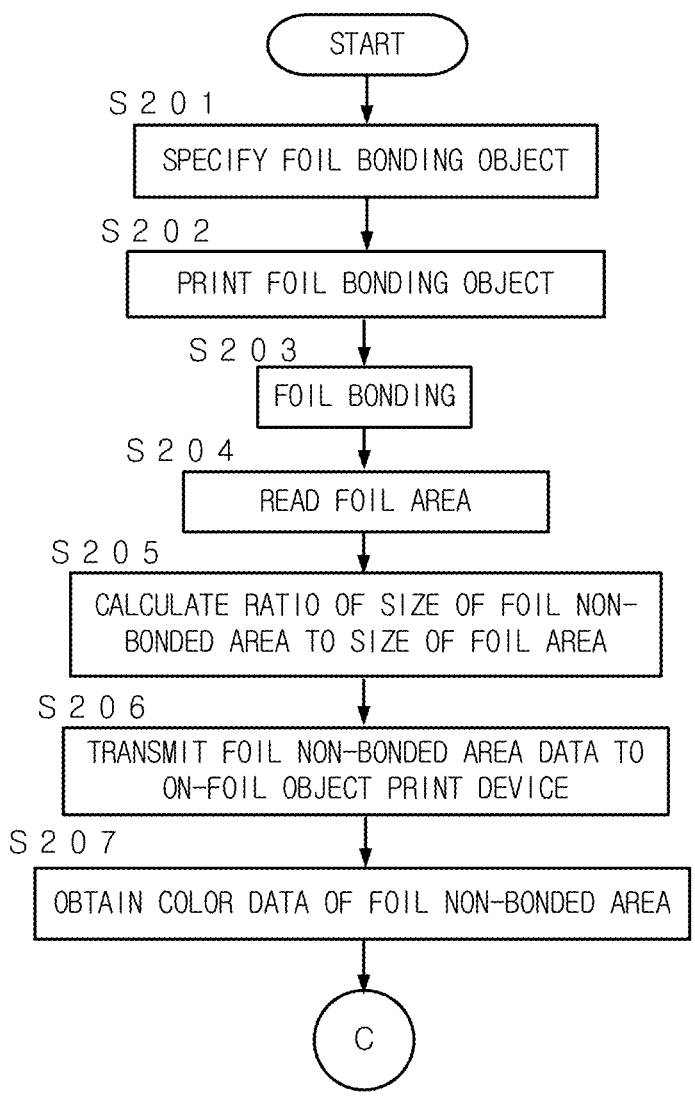
FIGS. 11 and 12 are a flowchart showing the method for printing the on-foil object and the normal object by the print system according to one or more embodiments of the invention.
Figure 12:
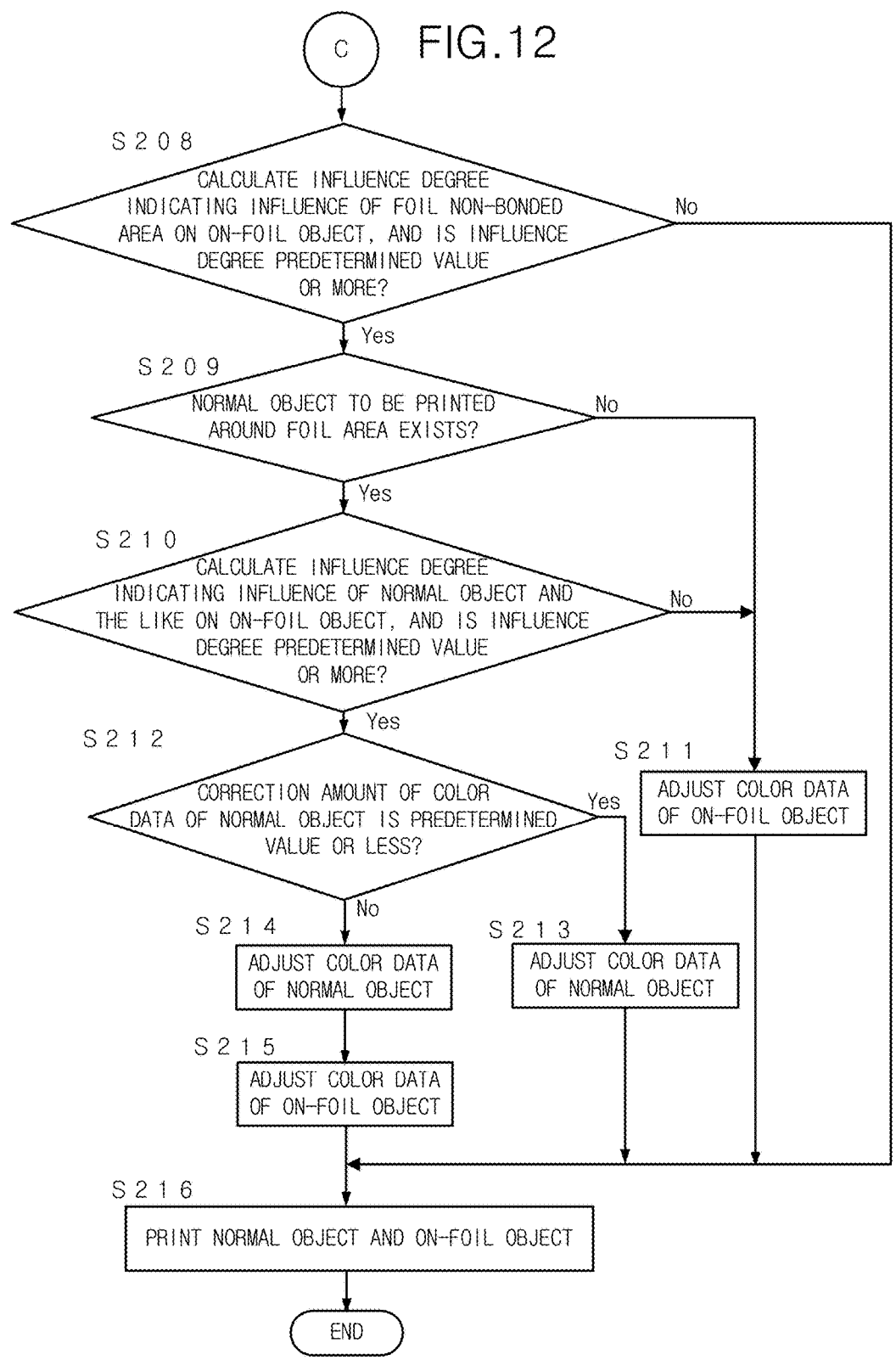

FIGS. 11 and 12 are a flowchart showing the method for printing the on-foil object and the normal object by the print system.

Firstly, when the print system 5 receives the print job from a client PC or the like, the foil-bonding object print device carries out the rasterizing process for the foil-bonding object data included in the print job. Then, the foil-bonding object print device specifies the foil-bonding object to be printed from the page data prepared by the rasterizing process (Step S201 in FIG. 11).

Then, the foil-bonding object print device prints the foil-bonding object specified in Step S201 on the paper sheet (Step S202).

The foil pressing device 50 carries out the foil-bonding in the part (foil area) on which the foil-bonding object is printed by foil-bonding object print device (Step S203).

The image reading device 60 recognizes the non-bonded area in the foil area from the image data obtained by optically reading the paper sheet on which the foil is bonded (Step S204). Then, the image reading device 60 calculates the size of the recognized non-bonded area.

Further, the image reading device 60 calculates the ratio of the size of the non-bonded area to the size of the foil area in accordance with the size of the foil area and the calculated size of the non-bonded area (Step S205) and prepares the non-bonded area data including the data indicating the calculated ratio. Then, the image reading device 60 transmits the non-bonded area data to the image forming apparatus 10 (Step S206).

The on-foil object print device receives the non-bonded area data and obtains the color data of the non-bonded area in the foil area (Step S207). Further, the on-foil object print device calculates the influence degree indicating the influence of the non-bonded area on the color of the on-foil object, in accordance with the data indicating the calculated ratio included in the non-bonded area data received from the image reading device 60, the color of the non-bonded area in the foil area, the color of the foil and the color data of the on-foil object to be printed in the foil area after the foil-bonding. Then, the on-foil object print device judges whether the calculated influence degree is the predetermined threshold value or more (Step S208 in FIG. 12).

Then, in case that it is judged that the influence degree calculated in Step S208 is less than the predetermined threshold value (Step S0208; No), the process proceeds to Step S216.

On the other hand, in case that it is judged that the calculated influence degree is the predetermined threshold value or more (Step S208; Yes), the on-foil object print device judges whether the normal object to be printed around the foil area exists or not (Step S209).

In case that it is judged that the normal object to be printed around the foil area does not exist (Step S209; No), the process proceeds to Step S211.

On the other hand, in case that it is judged that the normal object to be printed around the foil area exists (Step S209; Yes), the on-foil object print device calculates the influence degree indicating the influence of the non-bonded area and the normal object on the color of the on-foil object, in accordance with the ratio of the size of the non-bonded area in the foil area to the size of the foil area, the color of the non-bonded area in the foil area, the color of the foil used in the foil area, the color data of the on-foil object to be printed in the foil area after the foil-bonding and the normal object to be printed around the foil area (Step S210).

For example, when the brightness of the color of the normal object to be printed around the foil area is high, the brightness of the color of the on-foil object to be printed in the foil area is relatively decreased. Further, according to the shape of the normal object to be printed around the foil area (according to whether the normal object is printed in contact with only a part of boundary of the foil area or according to whether the normal object is printed in contact with all of the boundary of the foil area), there is some possibility that the brightness or the like of the color of the on-foil object is influenced. Therefore, in particular, the on-foil object print device calculates the influence degree indicating the influence of the non-bonded area and the normal object on the color of the on-foil object, in accordance with the normal object (the color data, the shape thereof and the like) to be printed around the foil area.

Specifically, the influence degree indicating the influence of the non-bonded area and the normal object on the color of the on-foil object is calculated as follows. For example, in case that the influence degree calculated in Step S208 (the decrease in the brightness of the color of the on-foil object due to the non-bonded area) is 5% and the brightness of the color of the normal object to be printed in contact with the all of the boundary of the foil area is 10% higher than the brightness of the color of the on-foil object which is ordinarily set in the print job or the like, the influence degree indicating the influence of the non-bonded area and the normal object on the color of the on-foil object is calculated as 15%. On the other hand, in case that the influence degree calculated in Step S208 is 5% and the brightness of the color of the normal object to be printed in contact with the all of the boundary of the foil area is 5% lower than the brightness of the color of the on-foil object which is ordinarily set in the print job or the like, the influence degree indicating the influence of the non-bonded area and the normal object on the color of the on-foil object is calculated as 0%.

Then, in case that it is judged that the influence degree calculated in Step S210 is less than the predetermined threshold value (Step S210; No), the process proceeds to Step S211. For example, this threshold value may be the influence degree calculated in Step S208. The on-foil object print device adjusts only the color data of the on-foil object in accordance with the influence degree calculated in Step S208 (Step S211).

On the other hand, it is judged that the influence degree calculated in Step S210 is the predetermined threshold value or more (Step S210; Yes), in order to keep the balance between the appearance of the on-foil object to be printed in the foil area and the appearance of the normal object to be printed around the foil area (in order to reduce the influence degree calculated in Step S210 to the predetermined value), it is necessary to adjust the color data of the normal object. However, when only the color data of the normal object is adjusted, there is some possibility that the color of the normal object is deviated from the expected color.

Therefore, firstly, the on-foil object print device calculates the correction amount of the color data of the normal object, which is required to keep the above balance, and judges whether the calculated correction amount is the predetermined value or less (Step S212). For example, in case that the change in the brightness of the color of the normal object due to the color data correction is within 10% on the basis of the brightness of the color of the normal object, which is ordinarily set in the print job or the like, it is judged that the correction amount of the color data of the normal object is the predetermined value or less.

In case that the on-foil object print device judges that the above correction amount is the predetermined value or less (Step S212; Yes), the on-foil object print device adjusts only the color data of the normal object by the above correction amount (Step S213).

On the other hand, the on-foil object print device judges that the above correction amount is more than the predetermined value (Step S212; No), the on-foil object print device adjusts the color data of the normal object (Step S214), and further adjusts the color data of the on-foil object (Step S215). For example, the on-foil object print device sets the adjustment amount of the color data of the normal object to ½ of the correction amount calculated in Step S212 and sets the adjustment amount of the color data of the on-foil object to ½ of the correction amount calculated in Step S212. Thereby, the influence degree indicating the influence of the non-bonded area and the normal object on the color of the on-foil object is decreased so as not to carry out the over adjustment for one of the color data of the on-foil object and the color data of the normal object.

Then, the on-foil object print device prints the normal object and the on-foil object on the paper sheet on which the foil is bonded in Step S203, in accordance with the image data of the normal object and the image data of the on-foil object (Step S216), and the process is ended.

According to the above-described method for adjusting the color data of the on-foil object and the color data of the normal object, even if the normal object to be printed around the foil area exists, it is possible to reduce the influence degree indicating the influence of the non-bonded area in the foil area and the normal object to be printed around the foil area on the color of the on-foil object by adjusting the color data of the normal object as necessary.

Various embodiments are explained above with reference to the drawings. However, in the present invention, the concrete configuration is not limited to any of the above embodiments. In the present invention, various modifications of the above embodiments or the addition of various functions or the like to the embodiments can be carried out without departing from the gist of the invention.

In the print system 5 according to one or more embodiments, the image reading device 60 calculates the ratio of the size of the non-bonded area to the size of the foil area, and transmits the non-bonded area data including the data indicating the calculated ratio to the on-foil object print device. However, the image reading device 60 may calculate the size of the non-bonded area in the foil area and may transmit the non-bonded area data including the data indicating the calculated size of the non-bonded area to the on-foil object print device. In this case, the on-foil object print device may calculate the ratio of the size of the non-bonded area to the size of the foil area in accordance with the size of the foil area and the size of the non-bonded area, which is calculated by the image reading device 60.

Alternatively, the image reading device 60 may transmit the image data obtained by reading the paper sheet on which the foil is bonded, to the on-foil object print device as the non-bonded area data relating to the non-bonded area. In this case, the on-foil object print device may calculate the size of the non-bonded area by analyzing this image data received from the image reading device 60 and may calculate the ratio of the size of the non-bonded area to the size of the foil area.

Further, some steps of the method shown in FIGS. 8 to 10 and some steps of the method shown in FIGS. 11 and 12 may be appropriately combined. Specifically, in the method shown in FIGS. 8 to 10, instead of each process indicated in Step S112 and Step S126 shown in FIGS. 9 and 10, the process indicated from Step S209 to Step S215 shown in FIG. 12 may be incorporated.

Further, in the method shown in FIGS. 8 to 10, in case that the ratio of the size of the non-bonded area in the foil division area to the size of the foil division area is the predetermined value or more in one foil division area, this paper sheet to be processed is recognized as the wasted paper sheet. However, in case that the ratio of the size of the non-bonded area in the foil division area to the size of the foil division area is the predetermined value or more in the predetermined number (2 or more) of the foil division areas, this paper sheet to be processed may be recognized as the wasted paper sheet.

In one or more embodiments, the foil-bonding object and the normal object are printed on the paper sheet. However, as the recording medium to be used for the printing, the material on which the image can be printed (the printable recording medium), for example, cloth, plastic, wood or the like, may be used.

Further, one or more embodiments of the present invention may include the program for causing an information processing device to function as the on-foil object color adjustment device or the non-transitory recording medium storing the above program.

In one or more embodiments, the ratio of the size of the non-bonded area to the size of the foil area is calculated in accordance with the non-bonded area data relating to the non-bonded area on which the foil is not bonded in the foil area after a foil-bonding is carried out for a printable recording medium. Then, the influence degree indicating the influence of the non-bonded area on the color of the on-foil object is calculated in accordance with the calculated ratio, the color of the non-bonded area, the color of the foil and the color data of the on-foil object to be printed in the foil area after the foil-bonding. The color data of the on-foil object is adjusted in accordance with the calculated influence degree.

In one or more embodiments, the ratio of the size of the non-bonded area to the size of the foil area is obtained. Then, the influence degree indicating the influence of the non-bonded area on the color of the on-foil object is calculated in accordance with the obtained ratio, the color of the non-bonded area, the color of the foil and the color data of the on-foil object to be printed in the foil area after the foil-bonding. The color data of the on-foil object is adjusted in accordance with the calculated influence degree.

In one or more embodiments, in case that a plurality of foil areas exist in the printable recording medium, the influence degree indicating the influence of the non-bonded area on the color of the on-foil object is calculated for each foil area. Then, the color data of the on-foil object to be printed in each foil area is adjusted.

In one or more embodiments, in case that the ratio of the size of the non-bonded area in the foil division area to the size of the foil division area is the predetermined value or more in the predetermined number of the foil division areas, this printable recording medium is recognized as the wasted recording medium.

In one or more embodiments, in case that the normal object to be printed around the foil area exists, the influence degree indicating the influence of the non-bonded area and the normal object on the color of the on-foil object is calculated in accordance with the ratio of the size of the non-bonded area in the foil area to the size of the foil area, the color of the non-bonded area in the foil area, the color of the foil used in the foil area, the color data of the on-foil object to be printed in the foil area after the foil-bonding and the normal object to be printed around the foil area. Then, the color data of the normal object to be printed around the foil area is adjusted.

In one or more embodiments, the color data of the on-foil object is further adjusted in accordance with the influence degree indicating the influence of the non-bonded area and the normal object on the color of the on-foil object.

According to the on-foil object color adjustment device, the image forming apparatus and the non-transitory recording medium storing a computer readable program, it is possible to reproduce the color of the on-foil object to be printed on the bonded foil to the expected color even if the portion at which the foil-bonding toner appears in the area in which the foil-bonding is carried out is caused, in case that the on-foil object is printed on the bonded foil.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An on-foil object color adjustment device, comprising:
   a data receiver that obtains non-bonded area data relating to a non-bonded area within a foil area, wherein
   the non-bonded area is an area where foil is not bonded in the foil area after foil-bonding is carried out for a printable recording medium, and
   the foil area is an area where a foil-bonding object is printed on the printable recording medium by using a foil-bonding toner and in which the foil-bonding is carried out after the foil-bonding object is printed; and
   a hardware processor that:
      calculates a ratio of a size of the non-bonded area to a size of the foil area based on the non-bonded area data obtained by the data receiver;
      calculates, based on the calculated ratio, a color of the non-bonded area, a color of the foil, and color data of an on-foil object, a first influence degree indicating an influence of the non-bonded area on a color of the on-foil object to be printed in the foil area after the foil-bonding; and
      adjusts the color data of the on-foil object based on the calculated first influence degree.

2. The on-foil object color adjustment device of claim 1, wherein
   a plurality of foil areas exists in the printable recording medium, and
   the ratio includes a ratio of a size of a non-bonded area in each of the foil areas to the size of the foil area; and
   the hardware processor:
      calculates, for each of the foil areas, the first influence degree based on the ratio of the size of the non-bonded area in each foil area to the size of the foil area, the color of the non-bonded area in each foil area, the color of the foil used in each foil area, and the color data of the on-foil object to be printed in each foil area after the foil-bonding; and
      adjusts the color data of the on-foil object to be printed in each foil area based on the calculated first influence degree for each foil area.

3. The on-foil object color adjustment device of claim 1, wherein
   the foil area is divided into a plurality of foil division areas, and
   the ratio includes a ratio of a size of a non-bonded area in each of the foil division areas to a size of the foil division area; and
   the hardware processor recognizes the printable recording medium as a wasted recording medium when the ratio of the size of the non-bonded area in the foil division area to the size of the foil division area is greater than or equal to a predetermined value in a predetermined number of foil division areas.

4. The on-foil object color adjustment device of claim 1, wherein
   the hardware processor:
      judges whether a normal object to be printed around the foil area exists;
      calculates a second influence degree indicating an influence of the non-bonded area and the normal object on the color of the on-foil object when the hardware judges that the normal object to be printed around the foil area exists; and
      adjusts color data of the normal object to be printed around the foil area based on the calculated second influence degree, wherein
      the calculated second influence degree is based on the ratio of the size of the non-bonded area in the foil area to the size of the foil area, the color of the non-bonded area in the foil area, the color of the foil used in the foil area, the color data of the on-foil object to be printed in the foil area after the foil-bonding and the normal object to be printed around the foil area.

5. The on-foil object color adjustment device of claim 4, wherein the hardware processor adjusts the color data of the on-foil object based on the calculated second influence degree.

6. An on-foil object color adjustment device, comprising:
a data receiver that obtains non-bonded area data including a ratio of a size of a non-bonded area within a foil area to a size of the foil area, wherein
the non-bonded area is an area where a foil is not bonded in the foil area after foil-bonding is carried out for a printable recording medium, and
the foil area is an area where a foil-bonding object is printed on the printable recording medium by using a foil-bonding toner and in which the foil-bonding is carried out after the foil-bonding object is printed; and
a hardware processor that:
calculates, based on the obtained ratio, a color of the non-bonded area, a color of the foil, and color data of an on-foil object, a first influence degree indicating an influence of the non-bonded area on a color of the on-foil object to be printed in the foil area after the foil-bonding; and
adjusts the color data of the on-foil object based on the calculated first influence degree.

7. The on-foil object color adjustment device of claim 6, wherein
a plurality of foil areas exists in the printable recording medium, and
the ratio includes a ratio of a size of a non-bonded area in each of the foil areas to the size of the foil area; and
the hardware processor:
calculates, for each of the foil areas, the first influence degree based on the ratio of the size of the non-bonded area in each foil area to the size of the foil area, the color of the non-bonded area in each foil area, the color of the foil used in each foil area, and the color data of the on-foil object to be printed in each foil area after the foil-bonding; and
adjusts the color data of the on-foil object to be printed in each foil area based on the calculated first influence degree for each foil area.

8. The on-foil object color adjustment device of claim 6, wherein
the foil area is divided into a plurality of foil division areas, and
the ratio includes a ratio of a size of a non-bonded area in each of the foil division areas to a size of the foil division area; and
the hardware processor recognizes the printable recording medium as a wasted recording medium when the ratio of the size of the non-bonded area in the foil division area to the size of the foil division area is greater than or equal to a predetermined value in a predetermined number of foil division areas.

9. The on-foil object color adjustment device of claim 6, wherein
the hardware processor:
judges whether a normal object to be printed around the foil area exists;
calculates a second influence degree indicating an influence of the non-bonded area and the normal object on the color of the on-foil object when the hardware judges that the normal object to be printed around the foil area exists; and
adjusts color data of the normal object to be printed around the foil area based on the calculated second influence degree, wherein
the calculated second influence degree is based on the ratio of the size of the non-bonded area in the foil area to the size of the foil area, the color of the non-bonded area in the foil area, the color of the foil used in the foil area, the color data of the on-foil object to be printed in the foil area after the foil-bonding and the normal object to be printed around the foil area.

10. The on-foil object color adjustment device of claim 9, wherein the hardware processor adjusts the color data of the on-foil object based on the calculated second influence degree.

11. An image forming apparatus, comprising:
the on-foil object color adjustment device of claim 1; and
a printer that prints the on-foil object in the foil area.

12. An image forming apparatus, comprising:
the on-foil object color adjustment device of claim 6; and
a printer that prints the on-foil object in the foil area.

13. A non-transitory recording medium storing a computer readable program which is executed by an information processing device,
wherein the program causes the information processing device to be the on-foil object color adjustment device of claim 1.

14. A non-transitory recording medium storing a computer readable program which is executed by an information processing device,
wherein the program causes the information processing device to be the on-foil object color adjustment device of claim 6.

* * * * *